(12) United States Patent
Grady et al.

(10) Patent No.: US 10,079,403 B2
(45) Date of Patent: Sep. 18, 2018

(54) BATTERY ARRAYS, CONSTRUCTIONS AND METHOD

(71) Applicant: CYMBET CORPORATION, Elk River, MN (US)

(72) Inventors: Steven C. Grady, Chanhassen, MN (US); Jeffrey S. Sather, Independence, MN (US); Blair A. Wilson, Wayzata, MN (US)

(73) Assignee: CYMBET CORPORATION, Elk River, MN (US)

( * ) Notice: Subject to any disclaimer, the term of this patent is extended or adjusted under 35 U.S.C. 154(b) by 52 days.

(21) Appl. No.: 14/554,918

(22) Filed: Nov. 26, 2014

(65) Prior Publication Data

US 2015/0200418 A1    Jul. 16, 2015

Related U.S. Application Data

(62) Division of application No. 13/014,195, filed on Jan. 26, 2011, now abandoned.

(Continued)

(51) Int. Cl.
*H01M 6/46* (2006.01)
*H01M 10/04* (2006.01)
(Continued)

(52) U.S. Cl.
CPC ..... *H01M 10/0436* (2013.01); *H01M 2/1022* (2013.01); *H01M 2/204* (2013.01);
(Continued)

(58) Field of Classification Search
CPC .......... H01M 10/0436; H01M 10/052; H01M 10/0525; H01M 10/0585; H01M 10/04207; H01M 10/425; H01M 10/0562
See application file for complete search history.

(56) References Cited

U.S. PATENT DOCUMENTS 5,314,765 A    5/1994  Bates
5,338,625 A    8/1994  Bates et al.
(Continued)

FOREIGN PATENT DOCUMENTS

DE    103 32 795        2/2005
EP    1460701 A2        9/2004
(Continued)

OTHER PUBLICATIONS

English-language machine translation of DE 103 32 795, 8 pgs, published Feb. 17, 2005.

(Continued)

*Primary Examiner* — Jimmy Vo
(74) *Attorney, Agent, or Firm* — Kagan Binder, PLLC

(57) ABSTRACT

Disclosed is a stacked array of a plurality of thin film batteries electrically connected in a staggered configuration, where the side edges of the array preferably generally conform to an interior surface of an electronic device or component thereof in order to save space. In an embodiment, the stacked array comprises at least one battery having a single surface in contact with a plurality of batteries. In another embodiment, a shaped array of a plurality of thin film batteries electrically are connected together, whereby a plurality of batteries are arranged in a single layer on a non-rectangular substrate adjacent to one another generally in the shape of the surface of the substrate. Additionally, a thin film battery is described having at least one via through the substrate and at least one other via through an insulation layer to provide electronic connection to the battery cell.

10 Claims, 15 Drawing Sheets

Related U.S. Application Data

(60) Provisional application No. 61/298,448, filed on Jan. 26, 2010.

(51) Int. Cl.

| | | |
|---|---|---|
| *H01M 2/10* | (2006.01) | |
| *H01M 2/20* | (2006.01) | |
| *H01M 2/22* | (2006.01) | |
| *H01M 2/26* | (2006.01) | |
| *H01M 6/40* | (2006.01) | |
| *H01M 10/052* | (2010.01) | |
| *H01M 10/0525* | (2010.01) | |
| *H01M 10/0585* | (2010.01) | |
| *H01M 10/42* | (2006.01) | |
| *H01M 4/64* | (2006.01) | |
| *H01M 4/131* | (2010.01) | |
| *H01M 4/133* | (2010.01) | |
| *H01M 10/0562* | (2010.01) | |

(52) U.S. Cl.
CPC ............ *H01M 2/22* (2013.01); *H01M 2/26* (2013.01); *H01M 4/64* (2013.01); *H01M 6/40* (2013.01); *H01M 6/46* (2013.01); *H01M 10/052* (2013.01); *H01M 10/0525* (2013.01); *H01M 10/0585* (2013.01); *H01M 10/425* (2013.01); *H01M 10/4207* (2013.01); *H01M 4/131* (2013.01); *H01M 4/133* (2013.01); *H01M 10/0562* (2013.01); *H01M 2220/30* (2013.01); *Y10T 29/49108* (2015.01); *Y10T 29/49112* (2015.01)

(56) References Cited

U.S. PATENT DOCUMENTS

| | | |
|---|---|---|
| 5,350,645 A | 9/1994 | Lake et al. |
| 5,445,906 A | 8/1995 | Hobson et al. |
| 5,512,147 A | 4/1996 | Bates et al. |
| 5,561,004 A | 10/1996 | Bates et al. |
| 5,567,210 A | 10/1996 | Bates et al. |
| 5,569,520 A | 10/1996 | Bates |
| 5,597,660 A | 1/1997 | Bates et al. |
| 5,612,152 A | 3/1997 | Bates |
| 5,654,084 A | 8/1997 | Egert |
| 5,705,293 A | 1/1998 | Hobson |
| 6,224,995 B1 * | 5/2001 | Fauteux ............ H01M 4/0442 29/623.1 |
| 6,713,987 B2 | 3/2004 | Krasnov et al. |
| 7,494,742 B2 | 2/2009 | Tarnowski et al. |
| 2004/0029311 A1 | 2/2004 | Snyder et al. |
| 2004/0185336 A1 | 9/2004 | Ito et al. |
| 2005/0141170 A1 | 6/2005 | Honda et al. |
| 2005/0147877 A1 | 7/2005 | Tarnowski et al. |
| 2007/0015060 A1 | 1/2007 | Klaassen et al. |
| 2008/0003492 A1 | 1/2008 | Bates |
| 2008/0203972 A1 | 8/2008 | Sather et al. |
| 2009/0086087 A1 * | 4/2009 | Kikuchi ............ H01M 8/04208 348/372 |
| 2009/0136842 A1 | 5/2009 | Hirota et al. |
| 2009/0155685 A1 | 6/2009 | Salot et al. |
| 2009/0159582 A1 | 6/2009 | Chami et al. |
| 2009/0186169 A1 | 7/2009 | Shacklette et al. |
| 2009/0214899 A1 | 8/2009 | Shakespeare et al. |
| 2012/0015236 A1 | 1/2012 | Spare |

FOREIGN PATENT DOCUMENTS

| | | |
|---|---|---|
| EP | 1488917 | 12/2004 |
| EP | 1460701 A3 | 6/2006 |
| EP | 2 081 245 | 7/2009 |
| JP | 2001-028275 | 1/2001 |
| JP | 2001028275 A | 1/2001 |
| JP | 2001-167743 | 6/2001 |
| JP | 2003-282142 | 10/2003 |
| KR | 2004-0095318 | 11/2004 |
| WO | 94/23465 | 10/1994 |
| WO | 2008/011061 | 1/2008 |

OTHER PUBLICATIONS

International Search Report, International Application No. PCT/US2011/022541, dated Feb. 11, 2011, 6 pgs.

Liu, et al., "A 'Lithium-Free' Thin-Film Battery with an Unexpected Cathode Layer," J. Electrochem. Soc. 155 (1) A8-A13 (2008).

\* cited by examiner

BATTERY ARRAYS, CONSTRUCTIONS AND METHOD

REFERENCE TO RELATED APPLICATIONS

This application is a divisional application of U.S. Ser. No. 13/014,195, which was filed on Jan. 26, 2011, now abandoned, which in turn application claims the benefit of priority under 35 U.S.C. 119(e)(1) of a provisional patent application, Ser. No. 61/298,448, filed Jan. 26, 2010, both of which is are incorporated herein by reference in their entirety.

BACKGROUND

1. Technical Field

This invention relates to the field of thin-film solid-state energy-storage devices, and more specifically to application configurations of thin-film solid-state batteries.

2. Description of the Related Art

Electronics have been incorporated into many portable devices such as computers, mobile phones, tracking systems, scanners, hearing aids, remote sensors, etc. One drawback to such portable devices is the need to include the power supply with the device. Portable devices typically use batteries as power supplies. Batteries must have sufficient capacity to power the device for at least the length of time the device is in use. Sufficient battery capacity can result in a power supply that is disproportionately heavy and/or large compared to the device. Accordingly, smaller and lighter energy storage devices (i.e., power supplies) are desired.

One such type of an energy-storage device is a solid-state, thin-film battery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

US Patent Application Publication No. 2005/0147877 describes a thin-film battery such as one that includes lithium or lithium compounds connected to an electronic circuit. An environmental barrier is deposited as alternating layers, at least one of the layers providing a smoothing, planarizing, and/or leveling physical-configuration function, and at least one other layer providing a diffusion-barrier function.

However, due at least in part to the relatively small size, such storage devices may not be able to provide adequate power for an associated electronic device. Of course multiple batteries may be connected in series or parallel, depending on the voltage and current requirements of a device, to increase power output over just a single battery. Such configurations, though, require multiple batteries and space in a small, portable device once again becomes an issue. Accordingly, there continues to be a need for devices and methods that facilitate provision of power supplies in small devices.

SUMMARY OF THE INVENTION

To address these needs, an arrangement of batteries is disclosed which may advantageously save space when powering an electronic device. In particular, a stacked array of electrically connected thin film batteries is provided in a staggered configuration.

The outermost points of side edges on one side of the stacked array preferably generally conform to an interior surface of an electronic device or component thereof in order to advantageously save space in the device. Such interior surface may be, for example, either planar or curved. In an embodiment, the stacked array comprises at least one battery having a single surface in contact with a plurality of batteries.

In another embodiment, a shaped array of a plurality of thin film batteries electrically connected together is provided, whereby a plurality of batteries are arranged in a single layer on a non-rectangular substrate adjacent to one another generally in the shape of the surface of the substrate.

The present invention advantageously provides in one embodiment a stacked array of batteries so that the battery array has a specialized shape, but is fabricated using individual batteries that can be readily mass produced. In another embodiment, the array of batteries is arranged in a manner to provide excellent efficiencies in use of space, while at the same time using individual batteries that can be readily mass produced. Thus, the present product can in one aspect provide the advantages of economies of scale through readily manufactured individual battery components, while at the same time providing uniquely shaped battery arrays suitable for custom applications on a relatively small scale. The present invention therefore provides efficiencies not available using conventional single battery cell custom shape manufacture technology.

A thin film battery is also provided wherein at least one via is provided through the substrate and at least one other via through an insulation layer to provide electronic connection to the battery cell. This battery configuration affords particular advantage in providing a battery that can be connected to a device having unique configuration requirements, and optionally providing an opportunity to avoid use of a separate package for containment of the battery. Additionally, the unique connection points of contacts for the battery enables alternative connection configurations of multiple batteries to be connected either in series or in parallel.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

Figure 1:
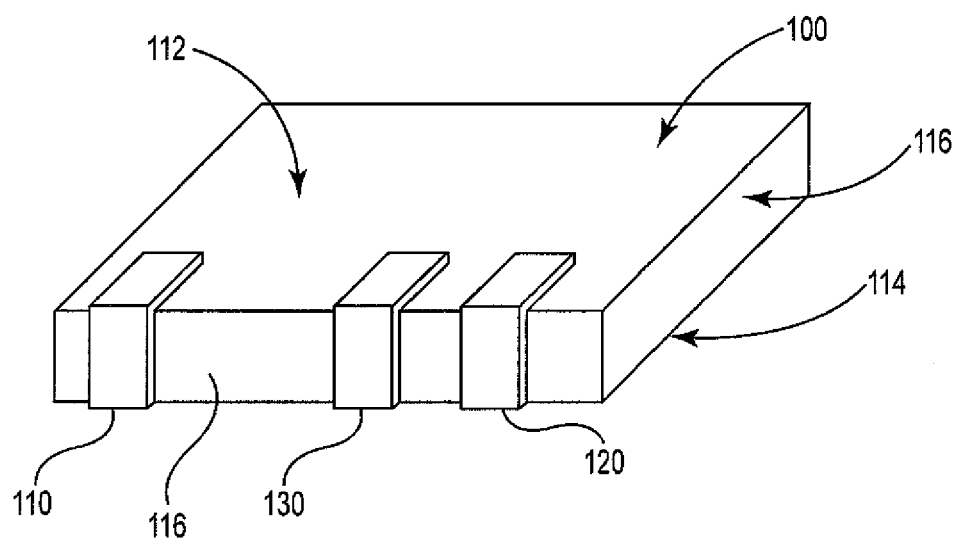
FIG. 1 is an illustration of a prior art thin-film battery suitable for use in a stacking array and method in accordance with the present invention.

It is to be understood that a device and method in accordance with the present invention includes, but is not limited to, novel combinations of conventional components, and not just particular detailed configurations thereof. Accordingly, the structure, methods functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In accordance with the present invention, multiple batteries of relatively small dimension, and having relatively flat form factor may be arranged inside a relatively small electrical device so as to form a three dimensional volume wherein at least one surface of the volume, which surface may be defined by edges of the stacked batteries, conforms to an interior surface of the device. Such batteries may be connected in serial or parallel with each other to provide power to the electrical device.

FIG. 1 shows a single battery 100 of the type that may be used in accordance with the present invention. Battery 100 is relatively small and has a relatively flat form factor. As shown, in the embodiment of FIG. 1 battery 100 is a rectangular box having a substantially rectangular upper face 112 and lower face 114 and rectangular edges. The vertical thicknesses of batteries such as battery 100 can be extremely thin (e.g., less than about 10 microns, in some embodiments, and even less than 4 microns in other embodiments) as compared to battery lateral widths (e.g., 1000 microns (=1 mm) to 10,000 microns (=10 mm) in some embodiments, and up to several centimeters in other embodiments). In one embodiment, battery 100 may include a ground connection 110 and a battery output 120 for connecting battery 100 to devices to be powered thereby. Additionally, battery 100 may include charging circuitry (not shown) as described in co-pending U.S. patent application Ser. No. 12/069,440, which is incorporated by reference herein in its entirety. If battery 100 includes such charging circuitry, battery 100 may additionally include a charger input 130.

Preferably, the single batteries to be used in the stacked array of the present invention are flexible, so that the batteries can survive flexing motion (i.e. are still functional as batteries) during either assembly, placement in the environment of use, or during use. Preferably, the batteries will survive a flex equivalent to the curvature of circle having a 20 cm diameter, more preferably equivalent to the curvature of circle having a 5 cm diameter, yet more preferably equivalent to the curvature of circle having a 1 cm diameter, and most preferably equivalent to the curvature of circle having a 0.5 cm diameter.

Figure 2:
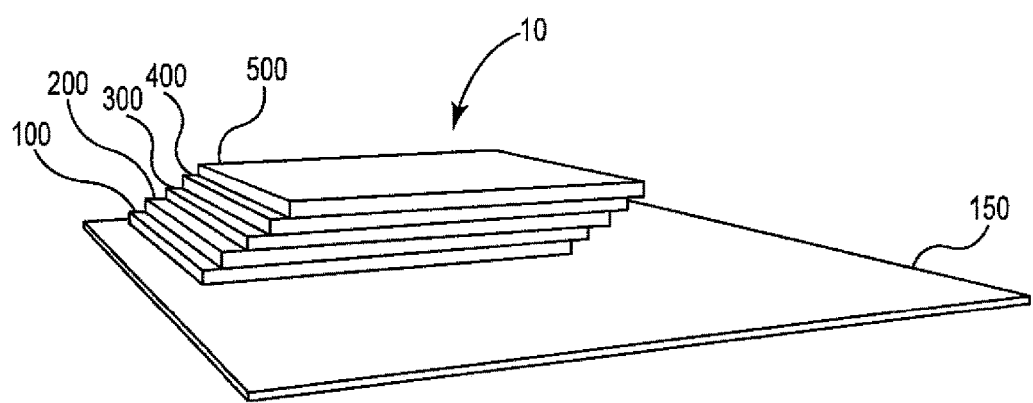
FIG. 2 is a perspective view of an illustration of one embodiment of a stacked array of thin-film batteries in accordance with the present invention.
Figure 3:
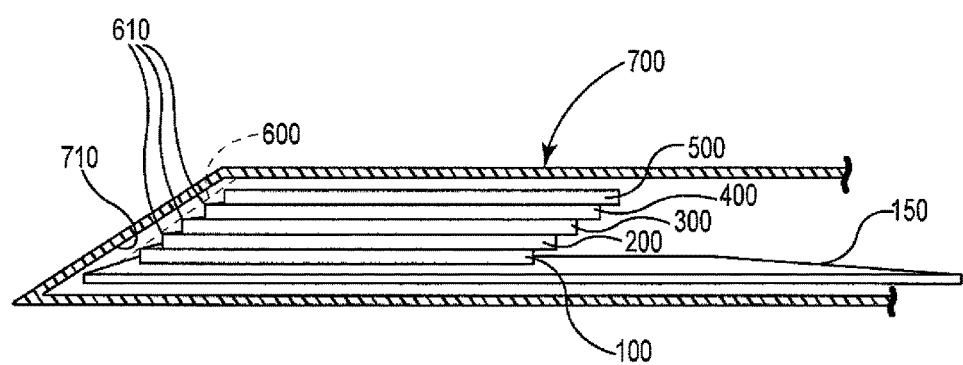
FIG. 3 is a side view of an illustration of the stacked battery array of FIG. 2 including a cross-sectional view of a device enclosure.

FIG. 2 shows a plurality of batteries 100, 200, 300, 400 and 500 of the type shown in FIG. 1 arranged relative to each other in accordance with the present invention. In particular, battery 100 is shown populated on a circuit board 150, which can be part of a small, electronic device (not otherwise shown in FIG. 2). The electronic device can be any relatively small device that requires for power more than one of the type of batteries 100 to 500. Batteries 100 to 500 are arranged in a stacked configuration or array 10 with the major faces thereof in contact with one another in a staggered configuration. The batteries 100 through 500 are preferably offset from one another by a distance that is on the order of the thickness of each battery. As shown in FIG. 3, which is a side view of the stacked arrangement of batteries 100 through 500 on circuit board 150 shown in FIG. 2, this offset of each battery from the one just beneath it defines an imaginary boundary line 600 defined by the outermost points of side edges on one side of the stacked batteries 100 through 500 adjacent to boundary line 600. As shown, boundary line 600 is a substantially straight line. For purposes of the present invention, the boundary line is a best fit of the curve of the outermost points of the side edges of the stacked batteries. Occasional outliers in the battery stack are expected, and therefore the skilled artisan will understand that a substantially straight boundary line contemplates, e.g., a 5% variance in the fit of the data points.

FIG. 3 includes a cross-section of an interior surface 710 of an electronic device 700. Electronic device 700 may be any relatively small device, such as a hearing aid or remote sensor, having an interior surface 710 that may be part of, for example, a casing of device 700. As shown, surface 600 formed by batteries 100 through 500 follows the contour of surface 710 of the electronic device so that it conforms to an interior surface of the electronic device or component thereof. In this way, space in the electronic device can advantageously be more efficiently used and the overall size of the electronic device can remain smaller.

Figure 4:
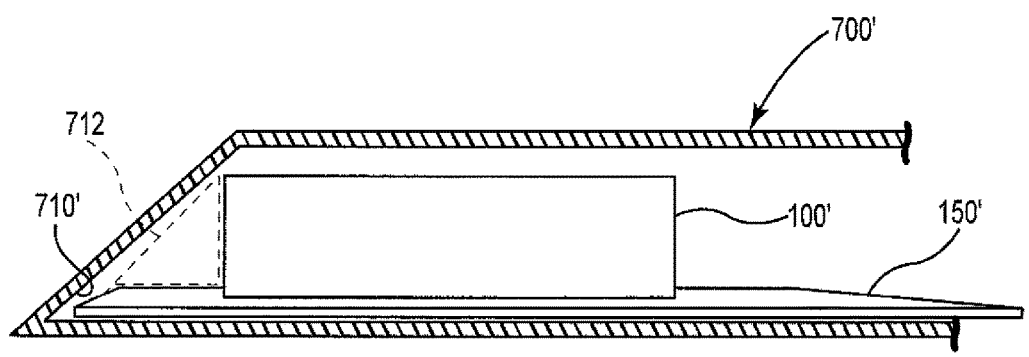
FIG. 4 is a side view of an illustration of a prior art single battery and a cross-section view of a device enclosure illustrating a space saving feature in accordance with the present invention.

In particular, while a single battery could be used to power device 700, to provide sufficient power to device 700 such a single battery would likely have to be larger than any single one of batteries 100 to 500. If such larger battery had substantially the same footprint as one of batteries 100 to 500 it would need to be taller and would likely be manufactured in a standard rectangular box or disk form factor. FIG. 4 illustrates such a prior art single battery 100' mounted on circuit board 150' in a relatively small device 700' having interior surface 710'. As shown in FIG. 4, in order to fit battery 100' into device 700' on circuit board 150' battery 100' would need to be shifted on circuit board 150' away from interior surface 710'. Thus, the space shown by dotted line 712 would be wasted and device 700' might have to be enlarged to accommodate battery 100'. It would also be possible to achieve the same volume of battery 100' by enlarging the footprint thereof and reducing the height. While this might allow circuit board 100' to be shifted back towards surface 710', such enlarged footprint battery would consume relatively more real estate on circuit board 150', likely requiring it to be enlarged. It might also be possible to custom manufacture a single battery having a volume substantially that of battery 100' and including a curved surface substantially in the form of surface 600 formed by batteries 100 to 500 (shown in FIGS. 2 and 3). However, the custom manufacture of such a battery would likely be cost prohibitive and any space-saving advantages provided with respect to device 700 would not likely transfer to other devices having different shapes.

As mentioned above, the electronic device powered by batteries 100 through 500 can be any relatively small device requiring more power than could be provided by just a single battery of the type of batteries 100 through 500. If the electrical device requires more current than could be provided by a single such battery, batteries 100 through 500 may be electrically connected in parallel. If more voltage is required by the electrical device, batteries 100 through 500 may be connected in series.

Batteries 100 through 500 may be fixed in a stack by any appropriate system, such as by encasing the batteries within a defined container or casing. The batteries may optionally be friction fitted into such a container. Optionally, the batteries may be affixed to a bracket or other holding structure. Preferably, the batteries are fixed to each other in the ultimately desired array. Batteries may be fixed to each other by solder welding or by a suitable adhesive, such as a hot melt adhesive, a chemically reactive adhesive or cement (such as one or two part adhesives including cyanoacrylates, acrylics, epoxies, polyurethanes, silicones, phenolics, polyimides, plastisols, and the like) or a pressure sensitive adhesive.

Figure 5:
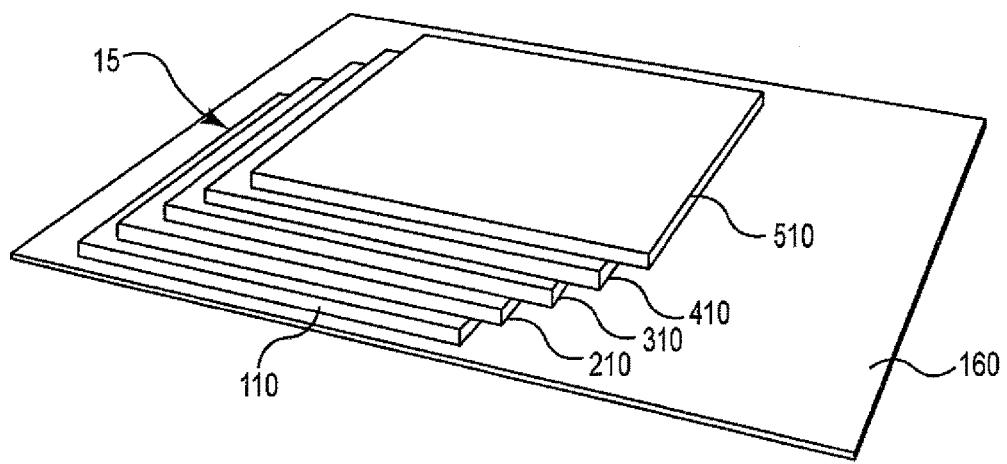
FIG. 5 is a perspective view of an illustration of a second embodiment of a stacked array of thin film batteries in accordance with the present invention.
Figure 6:
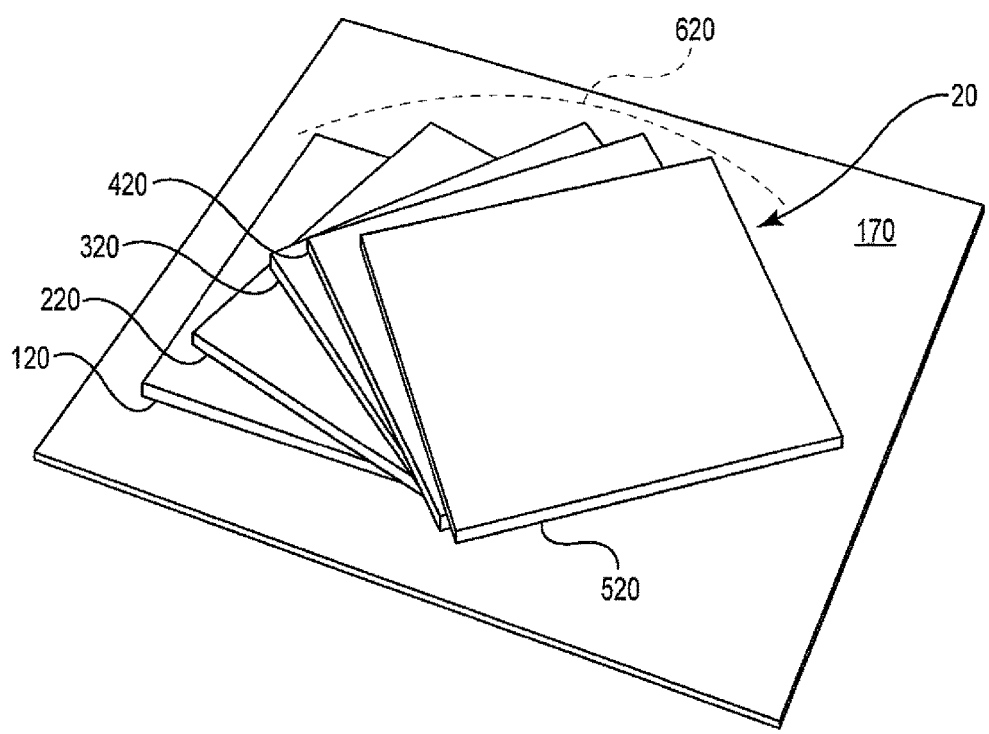
FIG. 6 is a perspective view of an illustration of a third embodiment of a stacked array of thin film batteries in accordance with the present invention.

FIG. 5 illustrates an alternate stacked array 15 using thin-film batteries 110 to 510 on circuit board 160. As shown in FIG. 5, each battery 210 to 510 is shifted laterally in two directions from the battery below it. Such a stacking configuration could provide space saving advantages in a device having an interior surface in which two walls slant inwards and meet at an edge. FIG. 6 illustrates another embodiment of a stacked array 20 including thin film batteries 120 to 520 on circuit board 170. In the embodiment of FIG. 6, batteries 120 to 520 are stacked such that each battery is laterally shifted and rotated from the battery beneath. Such a stacking configuration could advantageously save space if positioned adjacent to a curved interior surface of a powered device, such as a surface corresponding to the boundary line 620.

Figure 7:
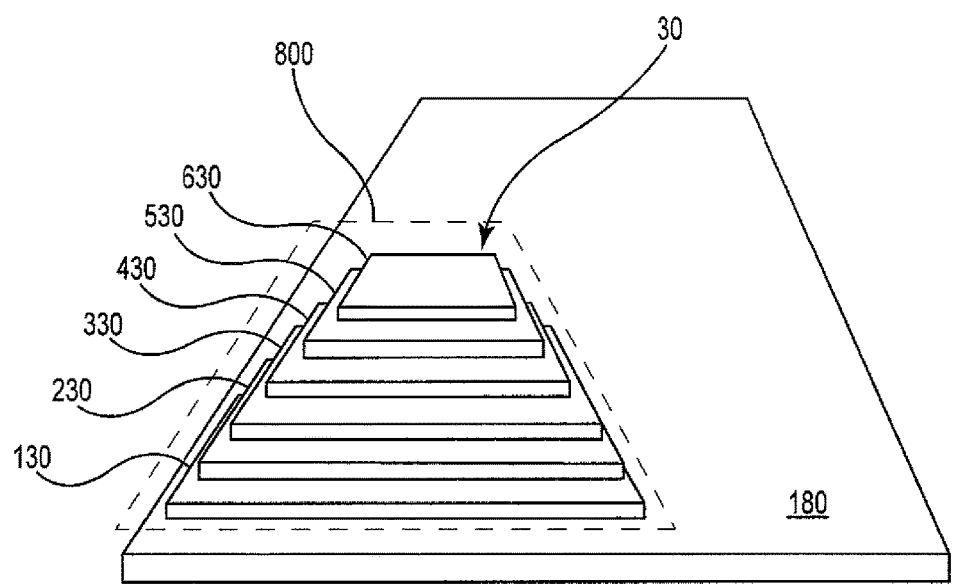
FIG. 7 is a perspective view of an illustration of a fourth embodiment of a stacked array of thin film batteries in accordance with the present invention.

Thin film batteries stacked in accordance with the present invention may also be of different size. For example, FIG. 7 illustrates one embodiment of a stacked array 30 of thin film batteries in accordance with the present invention. Array 30 includes six rectangular, thin film batteries 130, 230, 330, 430, 530 and 630 stacked on a substrate 180, preferably of an electronic device (not shown) powered by thin film batteries 130 to 630. As shown in FIG. 7, array 30 defines a three-dimensional pyramid shape 800.

Figure 8:
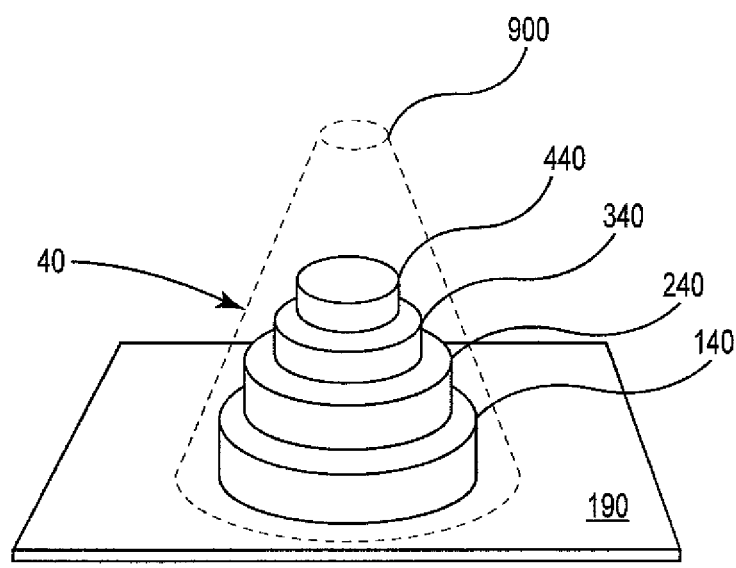
FIG. 8 is a perspective view of an illustration of a fifth embodiment of a stacked array of thin film batteries in accordance with the present invention.
Figure 10:
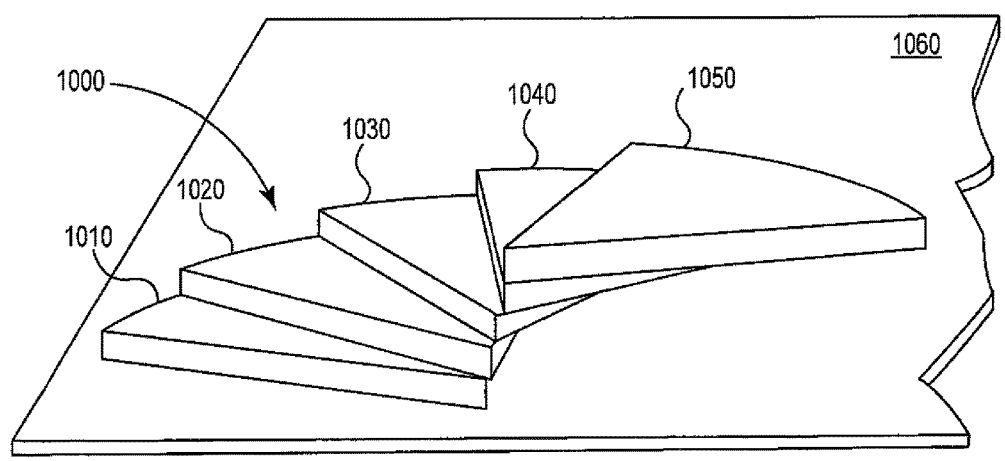
FIG. 10 is a perspective view of an illustration of a sixth embodiment of a stacked array of thin film batteries in accordance with the present invention.

In alternative embodiments of the present invention, a thin film battery stacking configuration in accordance with the present invention may include batteries having top perspective view shapes other than square or rectangular. For example, FIG. 8 illustrates stacked array 40 of 4 cylindrical thin film batteries 140, 240, 340 and 440 on substrate 190. Thin film batteries 140 to 440 are stacked to define a conical section 900. Stacking arrays including batteries having other top perspective view shapes such as, without limitation, crescents, semi-circles, triangles, and trapezoids are also considered. FIG. 10 illustrates stacked array 1000 of five pie-shaped thin film batteries 1010, 1020, 1030 and 1040 and 1050 on substrate 1060.

Stated another way, the stacked array defines a three dimensional volume selected from various shapes that provide custom, efficient use of space available in certain electronic devices. Embodiments of the present invention include arrays having three dimensional volume that is selected from a pyramid shape, a truncated pyramid, a conical shape, a truncated conical shape, a rhomboid, a spherical shape, a truncated spherical shape, an ellipsoid shape and a truncated ellipsoid shape.

For purposes of the present invention, a rhomboid is a solid figure with six faces in which each face is a parallelogram, opposite faces in pairs lie in parallel planes, and at least one angle is oblique. Ellipsoid shapes may be, for example, selected from oblate, prolate or scalene ellipsoid shapes.

In an embodiment of the present invention, the stacked array defines a three dimensional volume that is an oblique shape, such as an oblique cylinder or an oblique hexahedron. For purposes of the present invention, an oblique cylinder is a shape wherein the centers of the bases of a cylinder are not aligned directly one above the other.

Figure 9:
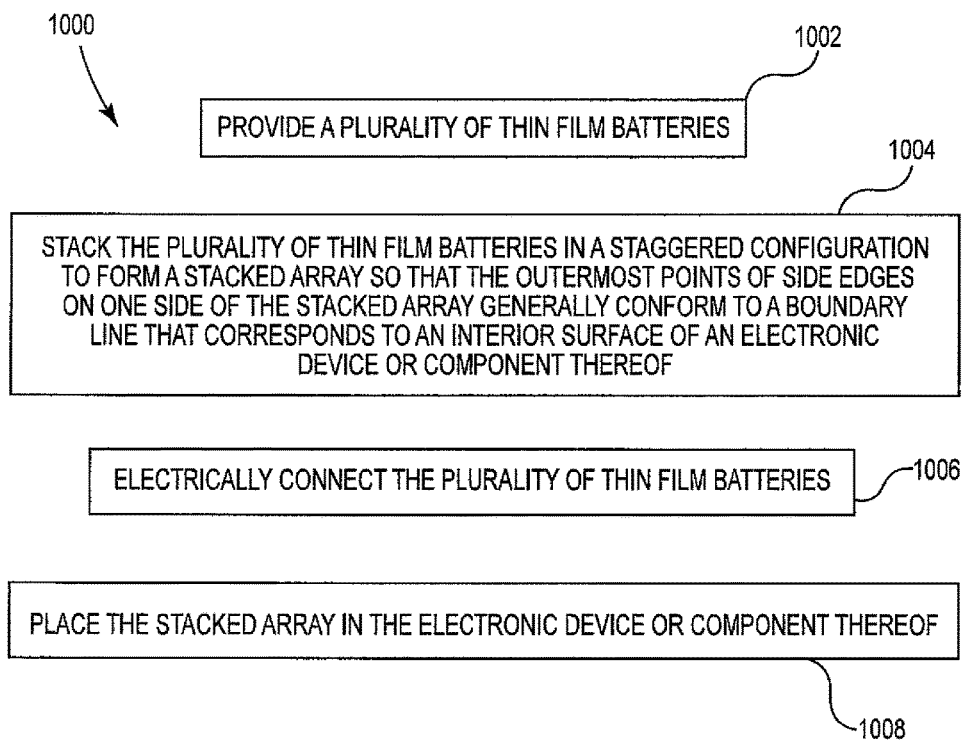
FIG. 9 is a flow chart illustrating one embodiment of a method in accordance with the present invention for powering an electronic device.

FIG. 9 is a flow chart illustrating one embodiment of a method 1000 in accordance with the present invention for powering an electronic device. In step 1002, a plurality of thin film batteries are provided. Then in step 1004 the provided thin film batteries are stacked in a staggered configuration to form a stacked array so that the outermost points of side edges on one side of the stacked array generally conform to a boundary line that corresponds to an interior surface of an electronic device or component thereof. This boundary line is discussed above and is illustrated in FIG. 3 as boundary line 600, and FIG. 6 as boundary line 620. For example the interior surface of the electronic device may be a planar surface or a curved surface.

In step 1006, the plurality of thin film batteries are electrically connected either in series or parallel to power the electronic device.

In step 1008, the stacked array prepared in step 1004 is placed in the electronic device or component thereof.

Optionally, step 1006 can be carried out before or after placing the stacked array in an electronic device or component thereof.

Figure 11:
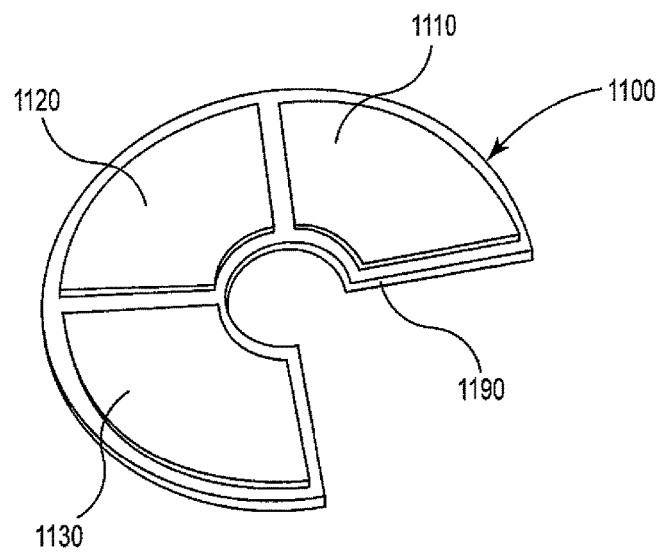
FIG. 11 is a perspective view of an illustration of a seventh embodiment of an array of thin film batteries in accordance with the present invention.

In another embodiment of the present invention, a thin film battery is provided in a shaped array of a plurality of thin film batteries electrically connected together, whereby a plurality of batteries are arranged in a single layer on a non-rectangular substrate adjacent to one another generally in the shape of the surface of the substrate. In an embodiment, the batteries are arranged such that no more than about 20%, and preferably no more than about 10%, of the surface of the substrate is exposed. Thus, as shown in FIG. 11, battery array 1100 comprises thin film batteries 1110, 1120 and 1130 on substrate 1190. Substrate 1190 has a portion of the substrate surface in the shape of a circle, and additionally the substrate surface comprises an annular hole. By using substrates having non-rectangular shape, an array of batteries may be efficiently placed in a device or location having strict space requirements, thereby delivering superior amounts of battery power in a particular environment as compared to conventional single batteries or rectangular battery arrays. Thin film batteries 1110, 1120 and 1130 are specially designed in shape, and are arranged to efficiently use as much of the available surface area of the uniquely shaped substrate as possible. Additionally, film batteries 1110, 1120 and 1130 are preferably uniform in size and shape, to take advantage of mass production efficiencies.

Figure 12:
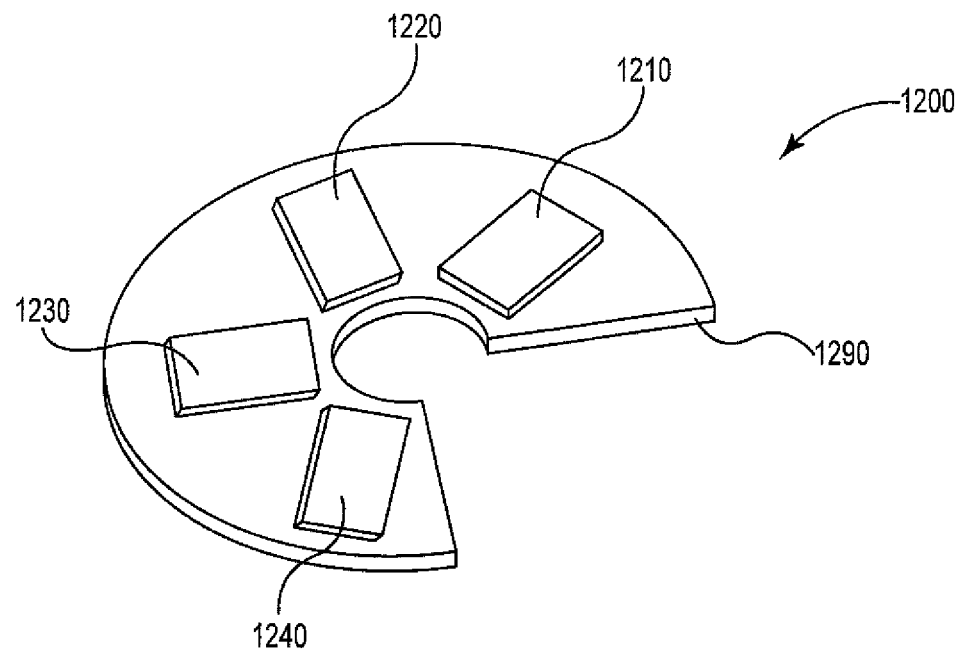
FIG. 12 is a perspective view of an illustration of an eighth embodiment of a stacked array of thin film batteries in accordance with the present invention.

Alternative shapes of substrates and/or individual batteries to be placed in an array may be used in a single layer array. FIG. 12 shows battery array 1200 that comprises thin film batteries 1210, 1220, 1230 and 1240 on substrate 1290. In this embodiment, thin batteries 1210, 1220, 1230 and 1240 are rectangular in shape, and so are easily mass produced. These batteries are arranged on substrate 1290 in an efficient manner to generally conform to the shape of the substrate surface to the extent possible given the rectangular shape. Thus, while larger amounts of the surface of substrate 1200 is exposed (i.e. is does not have a battery on the surface) as compared to battery array 1110 as shown in FIG. 11, the manufacturing and design efficiencies obtained by using a more regularly shaped thin film battery may offset the lower battery power available for certain applications.

Figure 13:
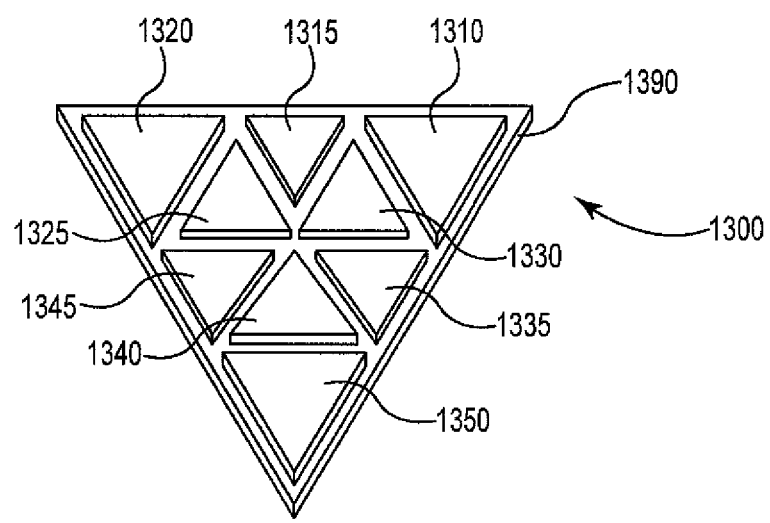
FIG. 13 is a perspective view of an illustration of a ninth embodiment of an array of thin film batteries in accordance with the present invention.

FIG. 13 shows battery array 1300 that comprises thin film batteries 1310, 1315, 1320, 1325, 1330, 1335, 1340, 1345, and 1350 on substrate 1390. In this embodiment, thin batteries 1310, 1315, 1320, 1325, 1330, 1335, 1340, 1345, and 1350 are triangular in shape, and so are easily mass produced. Additionally, the triangular shaped thin film batteries can be very efficiently laid out, particularly the triangular shaped surface of substrate 1390.

Advantageously, various uniquely shaped substrates can be fitted with uniformly sized and shaped batteries in this manner to efficiently utilize available surface area with mass produced thin film batteries. Both batteries and substrates having non-rectangular top perspective view shapes such as, without limitation, crescents, semi-circles, triangles, and trapezoids are specifically contemplated. The shape of the battery and the shape of the substrate may be the same or different, as demonstrated in FIGS. 12 and 13.

Figure 14:
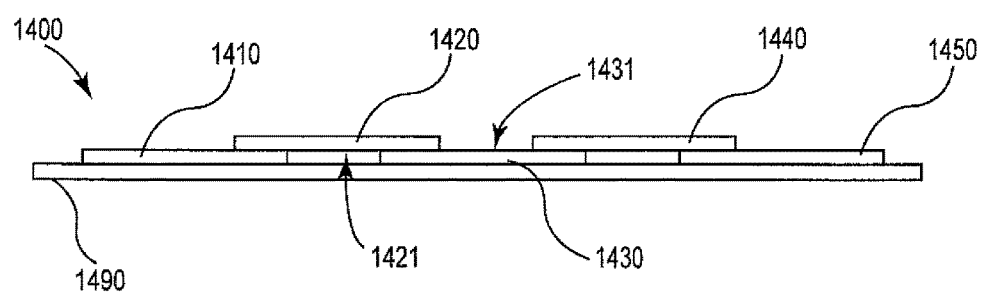
FIG. 14 is an edge view of an illustration of a tenth embodiment of a stacked array of thin film batteries in accordance with the present invention.

FIG. 14 shows an edge view of a battery array 1400 of the present invention that comprises thin film batteries 1410, 1420, 1430, 1440, and 1450 on substrate 1490. Battery 1420 has a single surface 1421 in contact with batteries 1410 and 1430. Likewise, battery 1430 has a single surface 1431 in contact with batteries 1420 and 1440. This arrangement provides an efficient use of valuable "real estate" in certain device constructions, and additionally provides opportunity for efficient connectivity between batteries in order to enable connection of the batteries in particular in series, due to proximity of the batteries. In an embodiment, the lower row of batteries 1410, 1430 and 1450 are oriented with all anodes or all cathodes on the substrate side of the array, and the upper row of batteries 1420 and 1440 are oriented with the opposite orientation of the lower row, thereby placing the cathodes of one row adjacent to cathodes of the other row, or the anodes of one row adjacent to the anodes of the other row. As shown, the battery array 1400 comprises two layers of thin film batteries. An array comprising more than two layers, such as an array of 3, 4, 5, 6, 7 . . . 10 layers and so forth wherein a plurality of batteries each have a single surface in contact with a plurality of batteries layers is specifically contemplated.

Figure 16:
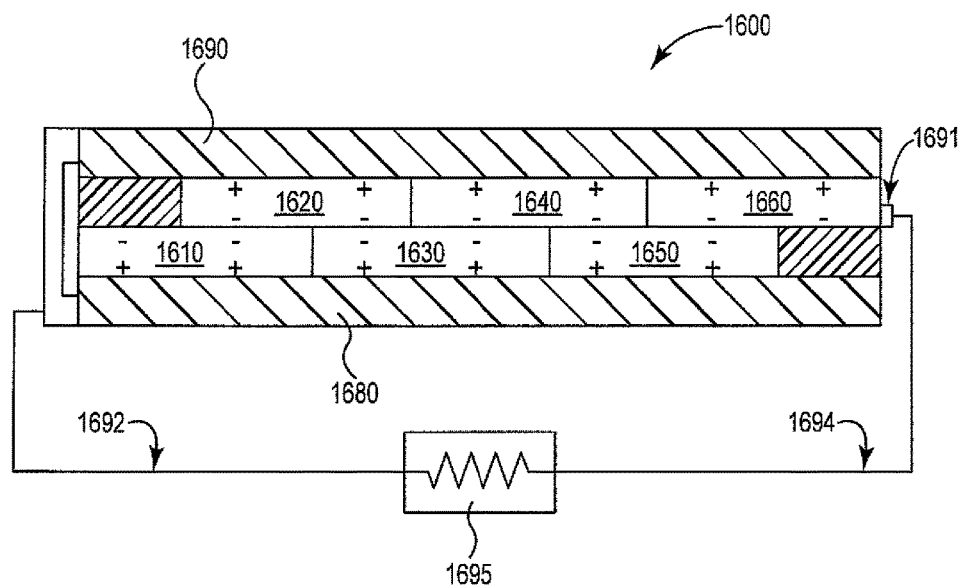
FIG. 16 is an edge view of an illustration of a stacked array of thin film batteries in accordance with the present invention wired in parallel.

FIG. 16 shows an edge view of a battery array 1600 of the present invention that comprises thin film batteries 1610, 1620, 1630, 1640, 1650 and 1660 connected in parallel. The batteries are provided with cathode connectivity on one side of the battery, and anode connectivity on the other side of the battery. As shown, the batteries are staggered, with the anodes, for example, battery 1630 in contact with an anode of both battery 1620 and 1640. The cathodes of batteries 1610, 1630 and 1650 are in contact with conductive substrate 1680, and the cathodes of batteries 1620, 1640 and 1660 are in electrical contact with conductive substrate 1690. Conductive substrates 1680 and 1690 are in electrical contact with device 1695 through electrical conduit 1692. The anodes are electrically connected through electrical contact 1691, and in turn are in electrical contact with device 1695 through electrical conduit 1694.

Figure 17:
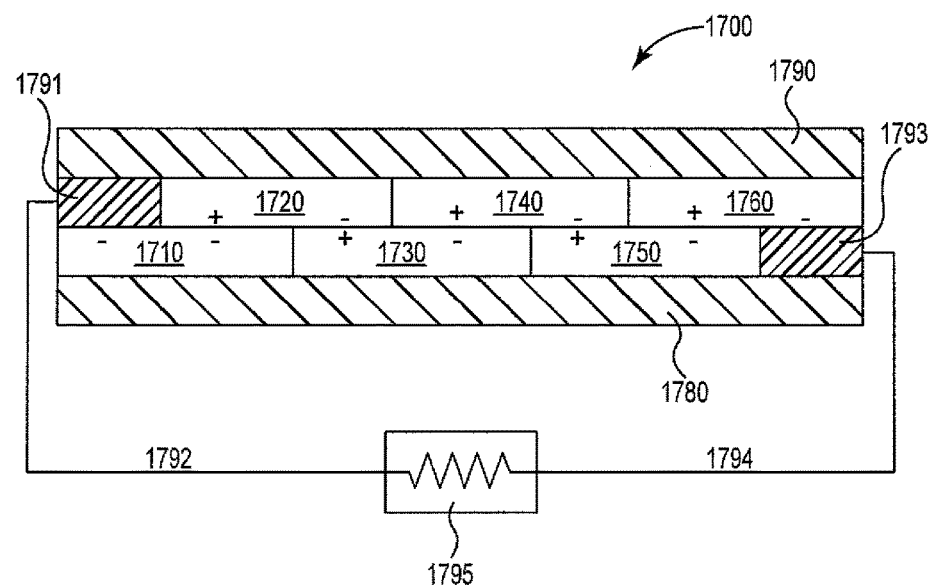
FIG. 17 is an edge view of an illustration of a stacked array of thin film batteries in accordance with the present invention wired in series.

FIG. 17 shows an edge view of a battery array 1700 of the present invention that comprises thin film batteries 1710, 1720, 1730, 1740, 1750 and 1760 connected in series on non-conductive substrates 1780 and 1790. The batteries are provided with cathode connectivity and anode connectivity on alternate ends of the same side of the battery. As shown, the batteries are staggered, with the anode, for example, of battery 1730 being in contact with the anode of battery 1740 and the cathode of battery 1730 being in contact with the anode of battery 1720. The cathode of battery 1710 is in contact with electrical contact 1791, which in turn is in electrical contact with device 1795 through electrical conduit 1792. The anode of battery 1760 is in contact with electrical contact 1793, which in turn is in electrical contact with device 1795 through electrical conduit 1794.

Figure 15:
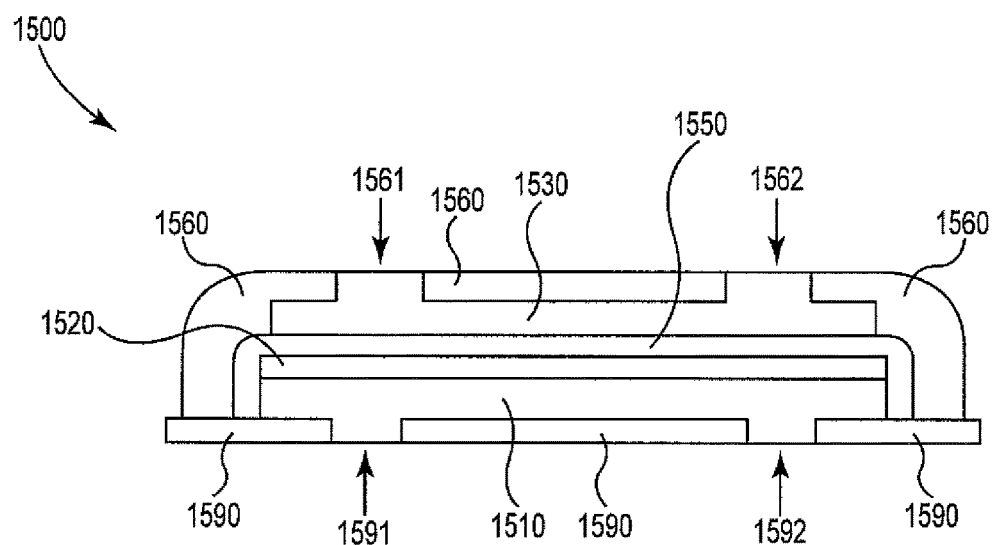
FIG. 15 is a cross sectional view of a battery of the present invention.

FIG. 15 shows a cross sectional view of a battery 1500 of the present invention, wherein at least one via is provided through the substrate and at least one other via through an insulation layer to provide electronic connection to the battery cell. Specifically, battery 1500 comprises a substrate 1590 provided with vias 1591 and 1592 therethrough. The substrate is a physical structure that acts as a carrier for a battery construction. In embodiments, the substrate is a basic work piece that is transformed by various process operations into the desired microelectronic configuration. In some embodiments, substrates include conducting material (such as copper, stainless steel, aluminum and the like), insulating material (such as sapphire, ceramic, or plastic/polymer insulators and the like), semiconducting materials (such as silicon), nonsemiconducting, or combinations of semiconducting and non-semiconducting materials. In some other embodiments, substrates include layered structures, such as a core sheet or piece of material (such as iron-nickel alloy and the like) chosen for its coefficient of thermal expansion (CTE) that more closely matches the CTE of an adjacent structure such as a silicon processor chip. In some such embodiments, such a substrate core is laminated to a sheet of material chosen for electrical and/or thermal conductivity (such as a copper, aluminum alloy and the like), which in turn is covered with a layer of plastic chosen for electrical insulation, stability, and embossing characteristics.

In some embodiments, substrate 1590 is about from about 500 microns to about 1000 microns thick. In an embodiment, substrate 1590 is a silicon wafer of from about 500 to about 650 microns thick. In another embodiment, substrate

1590 includes a polymer layer (e.g., Kapton) that is from about 1 to about 30 microns thick.

Vias 1591 and 1592 are formed in substrate 1590 in any appropriate manner, such as by etching, masking and other photolithographic techniques, drilling for example with a laser, and the like.

Cathode material 1520 (such as lithium cobalt oxide, $LiCoO_2$, lithium manganese oxide, lithium iron phosphate, lithium vanadium oxide, lithium nickel oxide, and the like) is located on cathode current collector 1510. Mixed metal oxides (for example, those that include combinations of the above mentioned metals), such as lithium nickel cobalt oxide, can also be used to fabricate cathodes. In embodiments of the present invention, cathode material 1520 has a thickness of about 1 to 3 microns.

Cathode current collector 1510 is exposed to provide connectivity for electrical connection to a device to be powered by battery 1500 (e.g. an integrated circuit) through vias 1591 and 1592.

Anode current collector 1530 is also provided, and is made from a conductive material such as copper, aluminum, nickel, iron, gold, silver, platinum, molybdenum, titanium, manganese, metal alloys, conductive ceramics, conductive semiconductors such as heavily doped polycrystalline silicon, and the like. In embodiments of the present invention, anode current collector 1530 has a thickness of about 0.1 to 1 microns, or preferably about 0.5 microns.

An anode (not shown) may optionally be provided in the battery during initial fabrication. In an embodiment, an anode is formed after assembly of the battery by the first charging of the battery. In a preferred embodiment, at least one component of battery 1500 is a lithium source, and a lithium metal anode is formed that is a layer of lithium metal by the first charging of the battery. In embodiments of the present invention, lithium ions are intercalated into an anode structure made from materials susceptible to such intercalation, such as graphite.

Electrolyte layer 1550 separates the cathode material 1520 from the anode current collector 1530 (and the anode, when present). In embodiments of the present invention, electrolyte layer 1550 has a thickness of from about 0.1 to about 10 microns. In embodiments of the present invention, electrolyte layer 1550 has a thickness of from about 1 to about 5 microns. Electrolyte layer 1550 is in physical contact with both the cathodic components and the anodic components to allow movement of ions therebetween. An electrolyte does not conduct electrons. An electrolyte can be liquid. An electrolyte can also be a solid, semi-solid, or combination of a porous solid and liquid, through which ions can pass. In some embodiments the electrolyte will be substantially chemically inert or non-reactive with regard to the ion or ions and electrode materials that are used to generate current within a battery or cell. Electrolyte layer 1550 may be made from any electrolyte material, such as LiPON and the like, which can be deposited as a glass film or layer through which lithium ions can pass if a source of lithium ions and a destination for the lithium ions is provided. It is specifically contemplated that electrolyte layer 1550 may comprise one or more electrolyte materials, either blended or in two or more distinguishable layers. An example of a preferred multilayered electrolyte construction is described in U.S. patent application Ser. No. 11/458,091 entitled "THIN-FILM BATTERIES WITH SOFT AND HARD ELECTROLYTE LAYERS AND METHOD," which is hereby incorporated by reference in total for all purposes.

Insulation layer 1560 is provided to protect and insulate the conductive components of battery 1500.

In embodiments of the present invention, insulation layer 1560 has a thickness of from about 1 to about 10 microns. Insulation layer 1560 is made from an electrically insulating material, such as photoresist (e.g., Shipley 220 photoresist; various polyimides from HD Microsystems, such as the 2720 series, which includes 2727, 2723, 2729; the 2770 series which includes 2770 and 2772; the 2730 which includes 2731 and 2737; the PIX Series which includes PIX-1400, PIX-3476, PIX-5200, PIX-6400; the 2500 series, which includes 2525, 2555, 2575 and 2556; and various other polymeric materials such as Cyclotene product numbers 3022-35, 3022-46, 3022-57 and 3022-63 from Dow Chemical Company; photodefinable silicones such as WL-5351 and WL-3010 from Dow Chemical Company; and UV curable epoxy such as 9001 from Dymax Corporation, or the like. In some embodiments, insulation layer 1560 includes one or more materials such as silicon oxide, LiPON, aluminum oxide, silicon nitride, silicon oxynitride, boron nitride, ceramic, cermet, or other metal oxide, metal nitride, metal carbide, metal oxyboride, and/or metal oxynitride, wherein the metal is aluminum, indium, tin, indium-tin, zirconium, niobium, tantalum or other suitable metal, or other suitable electrical insulator. An insulation layer that is made from a material that will be self leveling for efficient planarization is preferred. In a preferred embodiment, the insulation layer is an organic material.

Vias 1561 and 1562 are formed in insulation layer 1560 in any appropriate manner, such as by etching, masking and other photolithographic techniques, drilling for example with a laser, and the like. Anode current collector 1530 is exposed to provide connectivity for electrical connection to a device to be powered by battery 1500 (e.g. an integrated circuit) through vias 1561 and 1562.

Battery 1500 may additionally comprise one or more passivation layers, optionally in an alternating layered configuration with insulation layers. Batteries having alternating passivation and insulation layers are described in US Patent Publication No. US 2009/0214899 A1, and U.S. Pat. No. 7,494,742, the disclosures of which are incorporated herein by reference. Batteries of similar construction, except where the lowermost current collector is exposed to provide connectivity for electrical connection to a device to be powered by battery 1500 (e.g. an integrated circuit) through at least one via in the substrate is expressly contemplated. Passivation layers as described herein are made from conductive metals, such as from a conductive material such as copper, aluminum, nickel, iron, gold, silver, platinum, molybdenum, manganese, metal alloys, conductive ceramics, conductive semiconductors such as heavily doped polycrystalline silicon, and the like. In embodiments of the present invention, passivation layers have a thickness of from about 0.11 to about 5 microns. Passivation layers may be used to provide electrical coupling to an anode collector or a cathode collector, as appropriate, to provide remote location of a contact pad for electrical connection to a device to be powered by battery 1500.

The battery 1500 is preferably further provided with an encapsulating material (not shown) covering the components of the battery. The encapsulation is desirable in order to protect the battery materials from exposure to water vapor, oxygen, and other environmental contaminants. Lithium in particular reacts readily with other elements and compounds. Because certain thin film battery components are sensitive to exposure to environmental elements, the battery construction should be isolated from the outside world after production of the battery. The final encapsulation material preferably is an organic material as a silicone, polyimide, epoxy or other such polymer as discussed above. In an embodiment of the present invention, encapsulating material thickness is about 8 to 10 microns. In an embodiment of the present invention, a final outer layer is silicon nitride, at a thickness of about 0.5 to 1 microns, which provides additional hermetic protection and is compatible with integrated circuit packaging materials. This final layer also serves as something of a physical barrier to abrasion and handling damage.

As shown, a plurality of vias is provided in substrate 1590 and insulation layer 1560. In an embodiment, only one via is provided in either and/or both substrate 1590 and insulation layer 1560. In an embodiment, two or more vias are provided in either and/or both substrate 1590 and insulation layer 1560. Providing a plurality of vias in either and/or both substrate 1590 and insulation layer 1560 is advantageous, because this affords assurance of good contact in the event that one of the vias is unsatisfactory. Additionally, providing a plurality of vias in either and/or both substrate 1590 and insulation layer 1560 is advantageous in providing the battery configuration as shown in FIG. 14.

Figure 18:
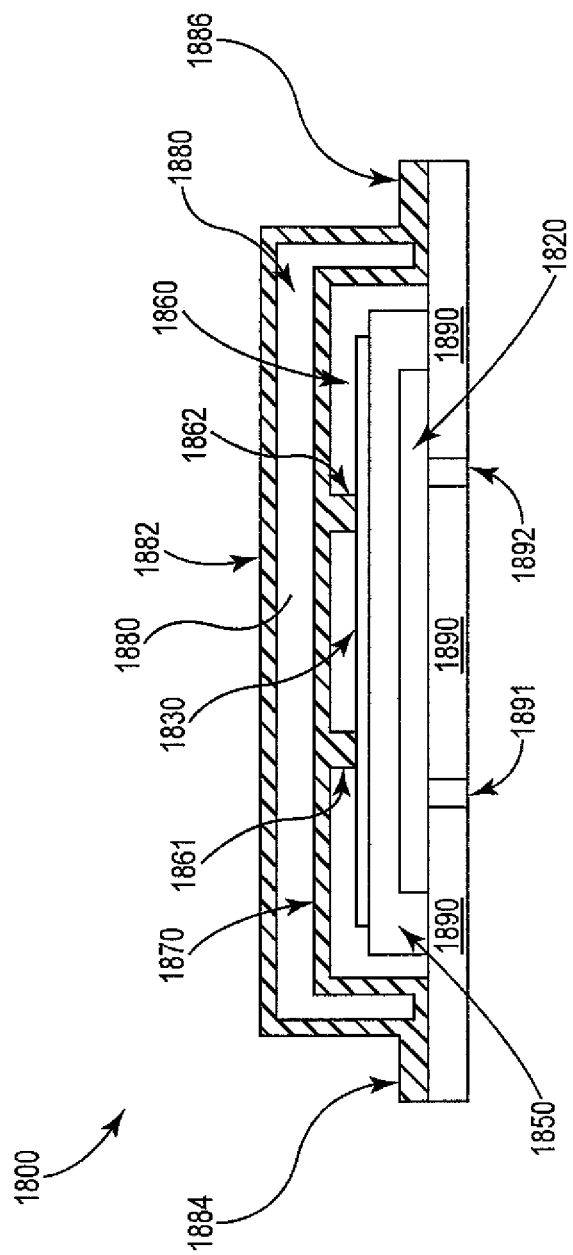
FIG. 18 is a cross sectional view of an embodiment of a battery of the present invention.

FIG. 18 shows a cross sectional view of a battery 1800 of the present invention, wherein at least one via is provided through the substrate and at least one other via through an insulation layer to provide electronic connection to the battery cell. Specifically, battery 1800 comprises a substrate 1890 provided with vias 1891 and 1892 therethrough. The substrate is a physical structure that acts as a carrier for a battery construction as described above.

Vias 1891 and 1892 are formed in substrate 1890 in any appropriate manner, such as by etching, masking and other photolithographic techniques, drilling for example with a laser, and the like.

Cathode material 1820 (such as lithium cobalt oxide, $LiCoO_2$, lithium manganese oxide, lithium iron phosphate, lithium vanadium oxide, lithium nickel oxide, and the like) is located on substrate 1890. Optionally, a separate cathode current collector may be provided as discussed above.

Anode current collector 1830 is also provided, and is made from a conductive material such as copper, aluminum, nickel, iron, gold, silver, platinum, molybdenum, titanium, manganese, metal alloys, conductive ceramics, conductive semiconductors such as heavily doped polycrystalline silicon, and the like. In embodiments of the present invention, anode current collector 1830 has a thickness of about 0.1 to 1 microns, or preferably about 0.5 microns.

An anode (not shown) may optionally be provided in the battery during initial fabrication. In an embodiment, an anode is formed after assembly of the battery by the first charging of the battery. In a preferred embodiment, at least one component of battery 1800 is a lithium source, and a lithium metal anode is formed that is a layer of lithium metal by the first charging of the battery. In embodiments of the present invention, lithium ions are intercalated into an anode structure made from materials susceptible to such intercalation, such as graphite.

Electrolyte layer 1850 separates the cathode material 1820 from the anode current collector 1830 (and the anode, when present). In embodiments of the present invention, electrolyte layer 1850 has a thickness of from about 0.1 to about 10 microns. In embodiments of the present invention, electrolyte layer 1850 has a thickness of from about 1 to about 5 microns. Electrolyte layer 1850 is in physical contact with both the cathodic components and the anodic components to allow movement of ions therebetween. Specific aspects of the electrolyte are as discussed above. In a preferred embodiment, electrolyte layer 1850 may be made from any electrolyte material, such as LiPON and the like, which can be deposited as a glass film or layer through which lithium ions can pass if a source of lithium ions and a destination for the lithium ions is provided.

A first insulative passivation layer 1860 is provided to protect and electrically insulate the conductive components of battery 1800. A first conductive passivation layer 1870 overlies first insulative passivation layer 1860 and is bonded to substrate 1890 on essentially the perimeter of the battery 1800. It has been found that conductive passivation layers, and in particular conductive passivation layers made from metal, are capable of providing excellent bonds in particular to silicon wafer materials. In this construction, electrolyte layer 1850, cathode material 1820 and anode current collector 1830 are encased between first conductive passivation layer 1870 and substrate 1890.

Vias 1861 and 1862 are formed in first passivation organic layer 1860 in any appropriate manner, such as by etching, masking and other photolithographic techniques, drilling for example with a laser, and the like. Anode current collector 1830 is thus electrically connected to first conductive passivation layer 1870.

Second insulative passivation layer 1880 is provided to further protect and electrically insulate the conductive components of battery 1800. Second conductive passivation layer 1882 overlies second insulative passivation layer 1880 and is bonded to first conductive passivation layer 1870 on essentially the perimeter of the battery 1800. Because of this bond of second conductive passivation layer 1882 to first conductive passivation layer 1870, the negative electrical connection of battery 1800 to a device to be powered may optionally be made at any location on second conductive passivation layer 1882. In a preferred embodiment, separate contact pads 1884 and/or 1886 may be formed so that electrical connection (e.g. by solder weld) is not made at a point corresponding to the main body of the battery. As shown, the positive electrical connection of battery 1800 to a device to be powered may be made at vias 1891 and 1892 formed in substrate 1890.

In embodiments of the present invention, first and second insulative passivation layers 1860 and 1880 independently have a thickness of from about 1 to about 10 microns. First and second insulative passivation layers 1860 and 1880 are independently made from an electrically insulating material, such as photoresist (e.g., Shipley 220 photoresist; various polyimides from HD Microsystems, such as the 2720 series, which includes 2727, 2723, 2729; the 2770 series which includes 2770 and 2772; the 2730 which includes 2731 and 2737; the PIX Series which includes PIX-1400, PIX-3476, PIX-S200, PIX-6400; the 2500 series, which includes 2525, 2555, 2575 and 2556; and various other polymeric materials such as Cyclotene product numbers 3022-35, 3022-46, 3022-57 and 3022-63 from Dow Chemical Company; photodefinable silicones such as WL-5351 and WL-3010 from Dow Chemical Company; and UV curable epoxy such as 9001 from Dymax Corporation, or the like. In some embodiments, first and second insulative passivation layers 1860 and 1880 include one or more materials such as silicon oxide, LiPON, aluminum oxide, silicon nitride, silicon oxynitride, boron nitride, ceramic, cermet, or other metal oxide, metal nitride, metal carbide, metal oxyboride, and/or metal oxynitride, wherein the metal is aluminum, indium, tin, indium-tin, zirconium, niobium, tantalum or other suitable metal, or other suitable electrical insulator. An insulation passivation layer that is made from a material that will be self leveling for efficient planarization is preferred. In a preferred embodiment, the insulation passivation layer is an organic material.

Conductive passivation layers as described herein are independently made from conductive metals, such as from a conductive material such as copper, aluminum, nickel, iron, gold, silver, platinum, molybdenum, manganese, metal alloys, conductive ceramics, conductive semiconductors such as heavily doped polycrystalline silicon, and the like. In embodiments of the present invention, passivation layers have a thickness of from about 0.11 to about 5 microns.

The battery 1800 optionally is further provided with an encapsulating material (not shown) covering the components of the battery. In embodiments, the encapsulation is desirable in order to protect the battery materials from exposure to water vapor, oxygen, and other environmental contaminants. Lithium in particular reacts readily with other elements and compounds. Because thin film battery components in are sensitive to exposure to environmental elements, the battery construction should be isolated from the outside world after production of the battery. The final encapsulation material preferably is an organic material as a silicone, polyimide, epoxy or other such polymer as discussed above. In an embodiment of the present invention, encapsulating material thickness is about 8 to 10 microns. In an embodiment of the present invention, a final outer layer is silicon nitride, at a thickness of about 0.5 to 1 microns, which provides additional hermetic protection and is compatible with integrated circuit packaging materials. This final layer also serves as something of a physical barrier to abrasion and handling damage.

In an embodiment of the present invention, the battery 1800 provided with a plurality of conductive passivation layers does not comprise an outer encapsulation material. This embodiment provides convenient electrical connectivity by having an outermost conductive passivation layer, and additionally is sufficiently environmentally protected so that no further encapsulation material is required.

As shown, a plurality of vias are provided in substrate 1890 and insulative passivation layer 1860. In an embodiment, only one via is provided in either and/or both substrate 1890 and insulative passivation layer 1860. In an embodiment, two or more vias are provided in either and/or both substrate 1890 and insulative passivation layer 1860. Providing a plurality of vias in either and/or both substrate 1890 and insulative passivation layer 1860 is advantageous, because this affords assurance of good contact in the event that one of the vias is unsatisfactory. Additionally, providing a plurality of vias in either and/or both substrate 1890 and insulative passivation layer 1860 is advantageous in providing the battery configuration as shown in FIG. 14.

It will be understood that in one aspect of the invention, the battery is built in layers as a "bottom up" construction, whereby the substrate is provided, in order, with a cathode current collector, a cathode, a solid electrolyte, an anode (which is optional during the construction phase as discussed above), an anode current collector, and one or more encapsulant materials. Optionally, the cathode and anode may be provided in a side by side or other configuration. Alternatively, the battery may be constructed in the reverse order from that discussed above, so that the anode current collector is the located on the bottom of the battery adjacent the substrate. This configuration is less favored in the embodiment where the anode is formed upon charging, because this anode formation in certain embodiments will necessitate movement of most of the layers of the battery to accommodate formation of the anode. Alternatively, the layers may be formed separately and joined by a lamination process as will now be readily envisioned by the routineer in this art.

In an alternative embodiment, the battery may be initially prepared without a cathode. In this embodiment, the cathode is formed by charging the battery in a manner similar to the above described formation of the anode during the charging process. More specifically, by careful selection of materials for the electrolyte and the cathode current collector, an anode may formed by charging the battery. For example, when the electrolyte is LiPON and the cathode current collector is silver, it has been reported that metallic silver is oxidized to form silver cations, which diffuse into the LiPON electrolyte and displace the moveable lithium cations which migrate to form the metallic lithium anode. See Liu, et al., "A lithium-Free' Thin-Film Battery with an Unexpected Cathode Layer," J Electrochem. Soc. 155 (1) A8-A13 (2008).

As noted above, it might be possible to custom manufacture a single battery having an exterior surface similar to surface 600 shown in FIGS. 2 and 3 and that would have the space saving advantages of the configurations of the batteries described herein. However, such custom manufacture would likely be cost prohibitive and space saving advantages applicable with respect to the structure of device 700, for example, would not likely apply to other devices having different shapes. In a battery configuration in accordance with the present invention, however, no custom manufacture is necessary and space saving can advantageously be realized in devices of many different shapes and power requirements. In particular, stacking configurations can be realized using different numbers of batteries and different fundamental battery shapes.

In an embodiment of the present invention, the battery is fabricated in a sheet comprising multiple batteries, and the individual batteries are separated from the sheet in a desired two-dimensional shape using singulation techniques such as cutting, stamping, laser cutting and the like. Alternatively, batteries can be fabricated individually in a desired top planar view two-dimensional shape, without the need for physical separation of the batteries by a carrier substrate.

The stacked array of thin film batteries provides advantages in maximizing efficient use of space, and in conforming to irregular shapes. In an embodiment of the present invention, a stacked array is provided in a battery compartment, which is a containment vessel for the batteries. In another embodiment of the present invention an electronic device is provided comprising the stacked array in a battery compartment. In another embodiment, an intermediate battery component is provided which is a combination of the stacked array with another functional element, such as an integrated circuit that is preferably used in combination with the battery to perform a function in an electronic device. In another embodiment, an electronic device is provided that comprises an intermediate battery component, which is a combination of the stacked array with another functional element, such as an integrated circuit that is preferably used in combination with the battery to perform a function in an electronic device.

All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of providing power to an electronic device using a plurality of thin film batteries including:
   stacking the plurality of thin film batteries in a staggered configuration to form a stacked array having outermost points of side edges on one side of the stacked array;
   placing the stacked array in the electronic device so that the outermost points of side edges on one side of the stacked array generally conform to an interior surface of the electronic device; and
   before or after placing the stacked array in the electronic device, electrically connecting the plurality of thin film batteries, wherein the batteries are of uniform size and shape.

2. The method of claim 1 wherein the interior surface is a planar surface.

3. The method of claim 1 wherein the interior surface is a curved surface.

4. The method of claim 1, wherein the plurality of thin film batteries are electrically connected before placing the stacked array in the electronic device.

5. The method of claim 1, wherein the plurality of thin film batteries are electrically connected after placing the stacked array in the electronic device.

6. The method of claim 1, wherein the stacked array conforms to at least two adjacent inner surfaces of the interior of a compartment of the batteries.

7. The method of claim 1, wherein the plurality of thin film batteries have a top perspective view shape other than square or rectangular.

8. The method of claim 1, wherein the plurality of thin film batteries have a top perspective view shape selected from crescents and semi-circles.

9. The method of claim 1, wherein the plurality of thin film batteries have a top perspective view shape selected from triangles, and trapezoids.

10. The method of claim 1, wherein the plurality of thin film batteries are cylindrical thin film batteries.

* * * * *